Figure 1:
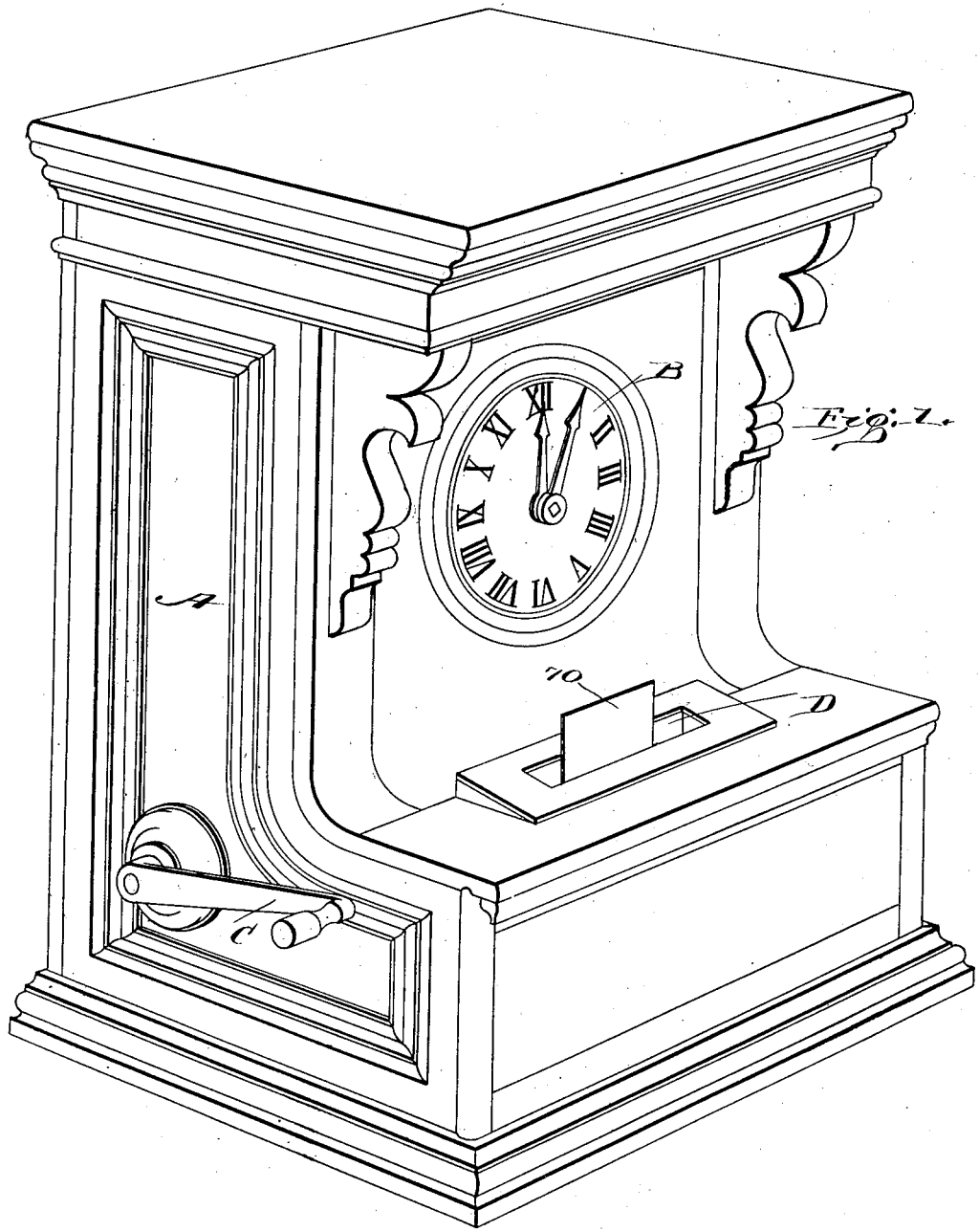

J. & A. DEY.
TIME RECORDER.
APPLICATION FILED JULY 14, 1903.

908,972.

Patented Jan. 5, 1909.
5 SHEETS—SHEET 1.

WITNESSES:
INVENTORS
BY
ATTORNEYS

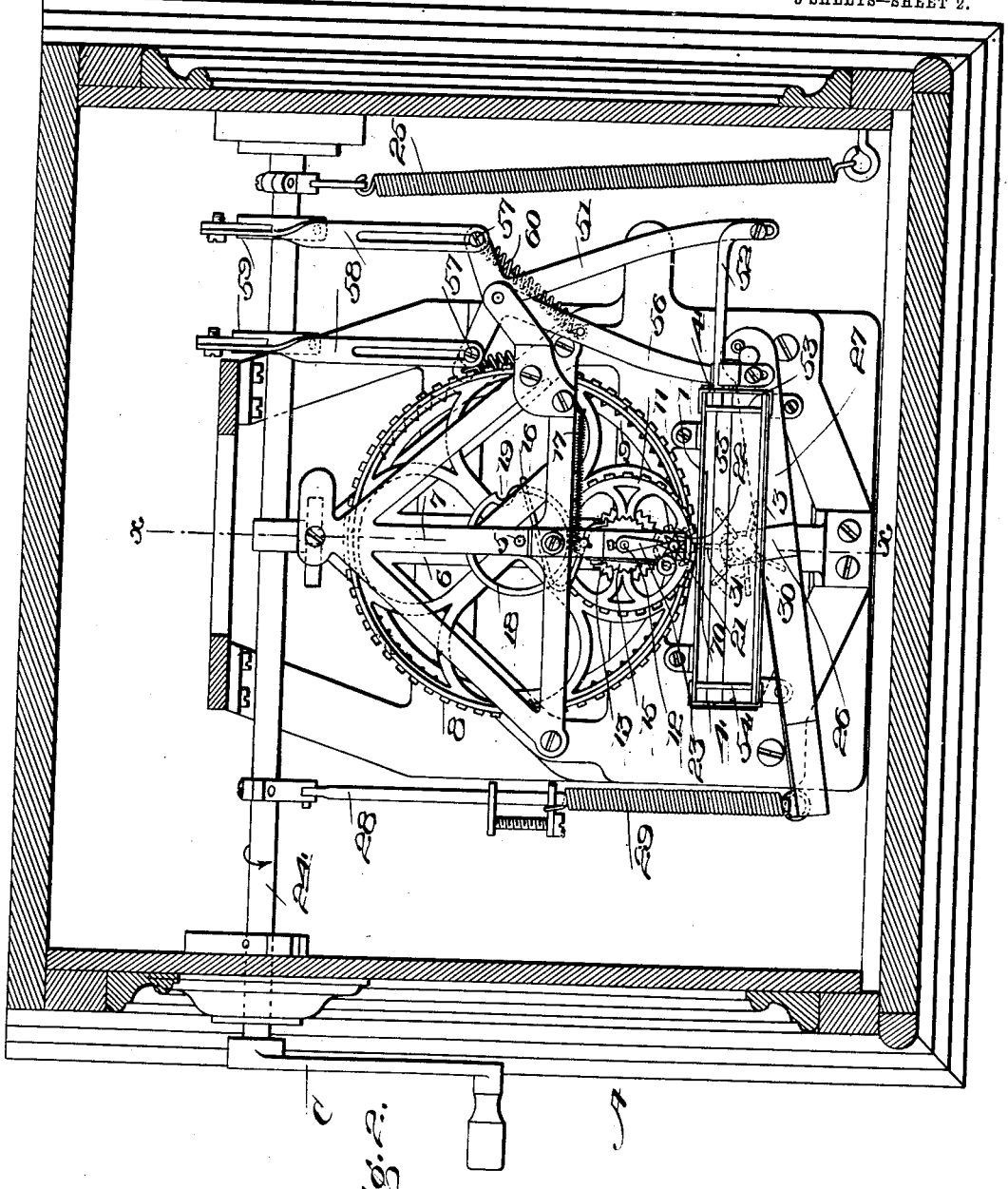

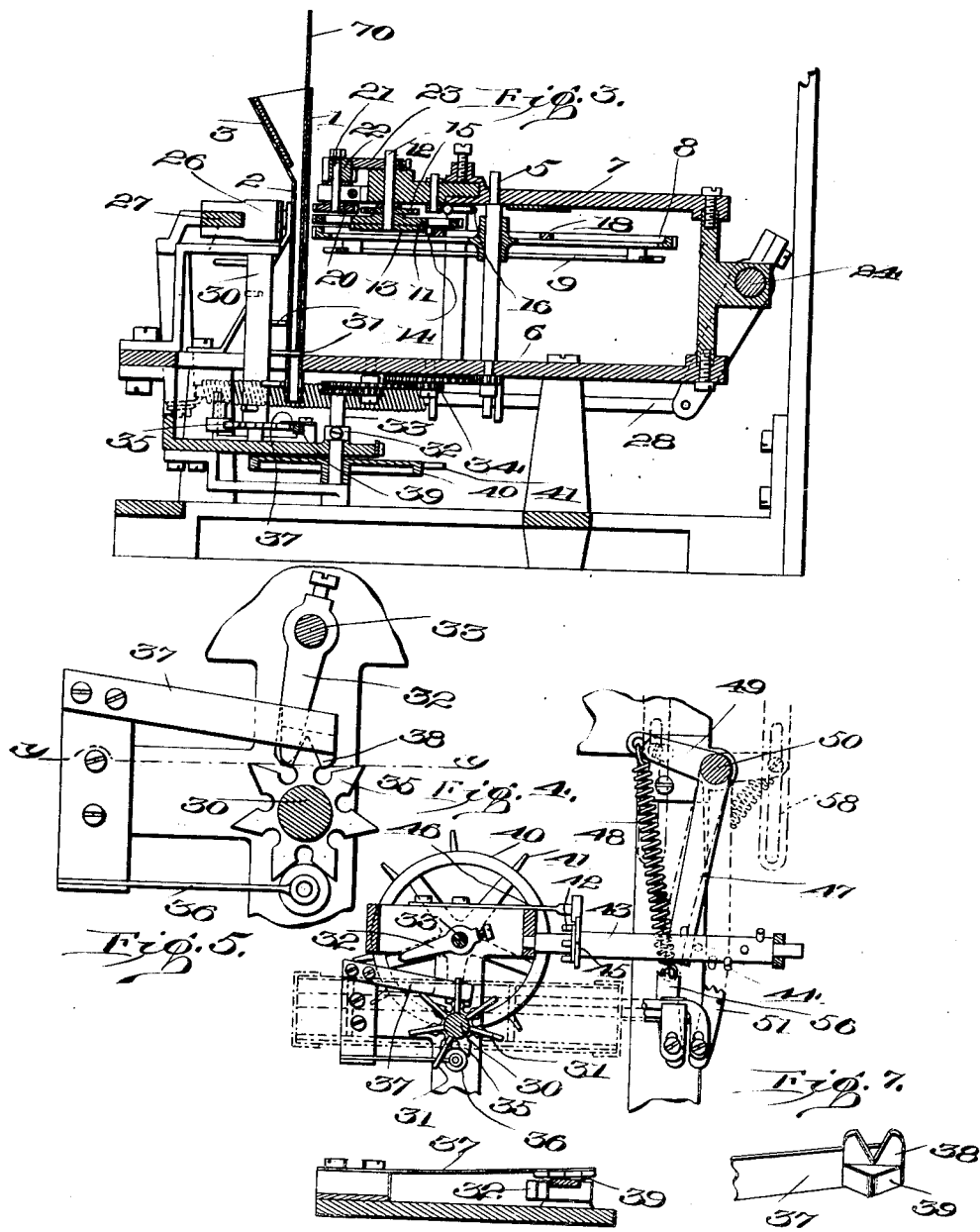

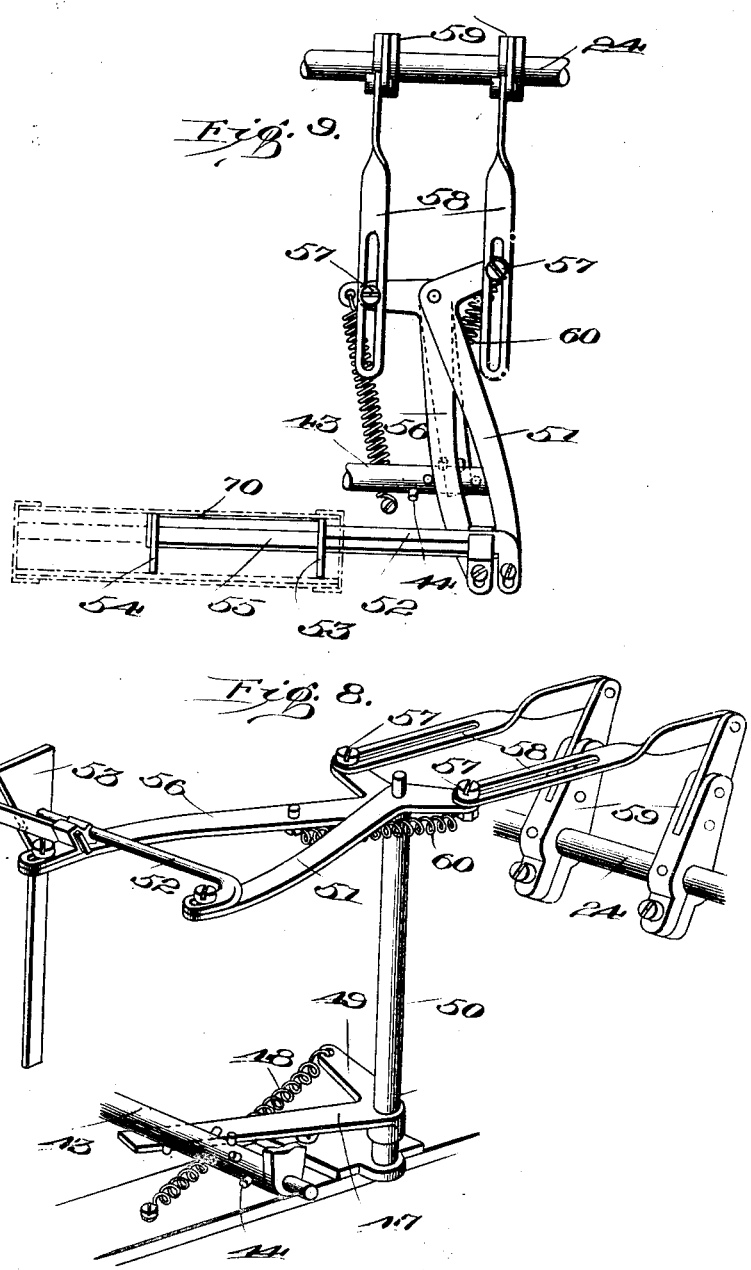

J. & A. DEY.
TIME RECORDER.
APPLICATION FILED JULY 14, 1903.

908,972.

Patented Jan. 5, 1909.

5 SHEETS—SHEET 5.

Fig. 10.

| | Sun | Sat | Fri | Thur | Wed | Tues | Mon | |
|---|---|---|---|---|---|---|---|---|
| Week ending | 7 655 | 6 655 | 5 655 | 4 655 | 3 655 | 2 655 | 1 655 | 1st |
| Name | 7 1204 | 6 1204 | 5 1204 | 4 1204 | 3 1204 | 2 1204 | 1 1204 | 2nd |
| No. | 7 1255 | 6 1255 | 5 1255 | 4 1255 | 3 1255 | 2 1255 | 1 1255 | 3rd |
| Total Time | 7 605 | 6 605 | 5 605 | 4 605 | 3 605 | 2 605 | 1 605 | 4th |
| Rate | 7 705 | 6 705 | 5 705 | 4 705 | 3 705 | 2 705 | 1 705 | 5th |
| Total Due | 7 905 | 6 905 | 5 905 | 4 905 | 3 905 | 2 905 | 1 905 | 6th |
| Daily Totals of Time | | | | | | | | |

WITNESSES:
Allan Foose
H. M. Seamans

INVENTORS
John Dey
Alexander Dey
BY
Duell Megrath & Wakefield
ATTORNEYS

UNITED STATES PATENT OFFICE.

JOHN DEY, OF SYRACUSE, NEW YORK, AND ALEXANDER DEY, OF GLASGOW, SCOTLAND, ASSIGNORS TO DEY TIME REGISTER COMPANY, OF SYRACUSE NEW YORK, A CORPORATION OF NEW YORK.

TIME-RECORDER.

No. 908,972.  Specification of Letters Patent.  Patented Jan. 5, 1909.

Application filed July 14, 1903. Serial No. 165,517.

*To all whom it may concern:*

Be it known that we, JOHN DEY, residing at Syracuse, in the county of Onondaga and State of New York, and ALEXANDER DEY, residing at Glasgow, in the county of Lanark, Scotland, have invented certain new and useful Improvements in Time-Recorders, of which the following is a full, clear, and exact description, such as will enable others skilled in the art to which it appertains to make and use the same.

This invention relates to a time recorder, and especially to that class of recorders adapted to be used with individual workmen's cards. Some of the features thereof, however, may be applied generally to recorders adapted to make an impression upon various surfaces, as a web, drum and the like, while other features are generic in their applicability to analogous arts.

The object of the invention is to provide a time recorder which shall be more efficient and certain in its action than recorders heretofore known.

Other objects and advantages will appear hereinafter.

The invention consists in the features of construction, combinations of elements and arrangement of parts which will be hereinafter fully described and the novel features thereof pointed out in the claims.

In the accompanying drawings, Figure 1 is an exterior perspective view of a recorder constructed in accordance with our invention as it appears when ready for use. Fig. 2 is a view showing the casing in section and a part of the interior in top plan. Fig. 3 is a vertical section on line x—x of Fig. 2. Fig. 4 is a detail partly in section and partly in top plan, showing one position of the devices for controlling the record card in its relation to the printing mechanism, and a part of the actuating means therefor. Fig. 5 is a detail on an enlarged scale showing a locking and actuating means for a banking roller which controls the depth to which the record card can be inserted in the printing slot. Fig. 6 is a detail on line y—y of Fig. 5. Fig. 7 is a perspective of the locking arm shown in Figs. 5 and 6. Fig. 8 is a perspective of a set of plungers which control the position of the record card transversely of the printing mechanism, with the actuating and governing means therefor. Fig. 9 is a top plan of the parts shown in Fig. 8, showing the plungers in a different position. Fig. 10 is a face view of a record card showing the arrangement of the data thereon as it appears when filled out in this recorder.

Similar reference characters refer to similar parts throughout the several views.

The casing of the machine, designated by A, may be of any suitable form and is usually provided with a clock face B traversed by the usual hands controlled from a suitable clock mechanism (not shown). An actuating lever C is conveniently situated at one side of the casing, and a slot is indicated at D into which a card may be dropped endwise, in position to have the impression made thereon by the printing mechanism. This slot may be of any desired width such that the card may be moved to bring various longitudinal columns thereof in line with the printing mechanism. Further than that the character of the slot is not of importance inasmuch as a novel and important feature of our invention comprises means whereby the card after being inserted between the printing means and the platen may be gripped and moved transversely to bring the proper space thereon, corresponding to the time when the impression is taken, to the printing point. Furthermore, the space between these gripping devices in itself constitutes a slot, and this word is used generically as a convenient means for designating the space into which the card is to be inserted, whether such space is definitely bounded or not. In the present instance the slot is defined (Figs. 2 and 3) by a rear wall 1 and a front wall 2 having a sloping upper end 3 for convenience of insertion of the card, the two being connected in any suitable way, as by straps 4—4.

Referring now to the printing mechanism, a minute spindle 5 adapted to be actuated from any suitable clock mechanism is journaled at its end in the horizontal supports 6 and 7. This spindle carries a minute wheel 8 provided with the usual notched detent or alining wheel 9. An hour wheel 11 is carried by spindle 12 journaled in the framework and is adapted to be actuated from the minute wheel through a toothed wheel 13 carried with the hour wheel and engaged at each revolution of the minute wheel by a pin 14 thereon. The hour wheel is also provided with a notched detent wheel 15 under the control of a pivoted braking lever 16 (Fig. 2), which is under tension from the spring 17 tending to hold the brake lever in contact with the hour wheel. A ring 18 on the minute wheel engages with the end of the braking lever at 16, said ring being broken away, as at 19, to allow movement of the hour wheel at the proper time, against the tension of the spring 17. In vertical alinement with the minute and hour wheel is a small calendar wheel 20 carried by a spindle 21 on the upper end of which is a star wheel 22 rotated intermittently by a tongue 23 on the spindle 12.

Lever C is connected to and actuates, in the direction of the arrow Fig. 2, the rock shaft 24 journaled in the casing, and which is the operating shaft of the machine, it being returned to initial position after each actuation by the spring 25. A platen 26 is carried by the lever 27 suitably pivoted at one end and it is actuated from the rock shaft 24 by connecting lever 28, having preferably a spring interposed, as at 29, to cushion the action of the platen. Obviously type segments or other forms of impression surfaces could be used instead of the type wheels which are shown only as a preferred form.

As best shown in Figs. 3 and 4, a banking roller or spindle 30 is suitably journaled in the framework provided with a series of pins 31 adapted to pass successively into the card slot through openings in the front and rear walls thereof, thereby limiting the point to which the card drops when inserted, in accordance with the particular pin which extends into the slot. This roller is rotated to bring the pins successively into position in the slot by the tongue 32 carried by a spindle 33 adapted to be driven by a suitable train of gearing, designated generally by 34, from the minute spindle 5. This tongue contacts at each revolution with the teeth of a star wheel or notched wheel 35 carried by the banking roller 30. An important feature of the present invention resides in the locking means shown in connection with this star wheel, which means could also be applied to the calendar wheel or to any other member the rotation of which it might be desired to control. The gearing 34 is designed to turn the spindle 33 through one revolution each 24 hours, thereby turning the star wheel 35 a distance of one tooth each day and bringing a new banking pin 31 corresponding to the tooth of the star wheel into operative position. This star wheel may, if desired, be engaged by the usual riding or jockey pulley 36, but with such a pulley there is nothing to prevent the turning of the star wheel and banking roller, whether by accident or otherwise, through one or more spaces, thereby breaking up the sequence of operation and confusing the registrations upon the card. To guard against this we provide means whereby the star wheel may be always locked to prevent intentional or accidental manipulation thereof. A locking arm 37 is connected to the framework and at the outer end thereof there is a notched holder 38. On the lower side of the arm there is a wedge-shaped block 39 with which the tongue 32 comes into contact just before it strikes the tooth of the wheel, as shown in Fig. 6, thereby raising the locking arm out of engagement with the wheel and permitting the rotation thereof. This arm 37 is preferably of spring material so that it drops back into place against the succeeding tooth when released by the tongue. Obviously, however, this locking arm might be pivoted and controlled by an independent spring. Thus the banking roller is always locked for a short time by the actuating tongue 32 and for the rest of the time by the locking arm or detent.

Pass now to the means for moving the card transversely of the slot or printing point. On the twenty-four hour spindle 33 is mounted a wheel 40 having spokes or arms 41 projecting outwardly from the rim thereof adapted to contact with the stars or teeth 42 on the end of a second banking roller 43. The number of spokes on the wheel, of teeth on the end of the banking roller and of pins 44 on the circumference of the roller, may be of any desired number proportioned to the number of movements desired during a particular period. The banking roller may also be provided with a detent star wheel 45 engaged by a jockey pulley on the end of an arm 46. The position of the pins 44 as the banking roller 43 is rotated determines the distance to which an arm 47 connected with the gripping mechanism may move under the influence of a spring 48 connected to an arm 49 at an angle to the first arm and carried by the same vertically disposed rock shaft 50. On the reduced upper end of this rock shaft is pivotally mounted a bell crank lever 51 the long arm of which carries through a connecting rod 52 a plunger 53 which acts as one of the gripping devices by which the card is seized and moved after insertion in the slot. The second plunger 54 which coöperates with the plunger 53 is carried through a connecting slide 55 by an angular lever 56 mounted upon and rocking with the shaft 50.

On the short arms of the bell crank lever 51 and the angular lever 56 are provided pins 57 adapted to play in longitudinal slots in the respective ends of levers 58 pivotally connected to arms 59 rocking with the shaft 24. A spring 60 connected at one end to the lever 56 and at the other end to the bell crank lever 51, turns said bell crank lever 51 on its pivot, the angular lever 56 which acts as the fixed point for spring 60 being controlled together with the shaft 50 by the spring 48 before mentioned. In the normal position of the parts as shown in Figs. 2 and 8, movement of either the bell crank lever 51 or the angular lever 56 under the influence of their springs is prevented by the engagement of the pins 57 in the ends of the slots in the connecting levers 58. When, however, these levers are released by the actuation of the main rock shaft through the lever C, the bell crank lever 51 will be rocked by the spring 60 to throw the plunger 53 toward its companion plunger, thereby gripping the card between the two plungers and the shaft 50 will be rocked under the influence of spring 48 to carry both the plungers and the card to a position which will be determined by the distance through which said shaft can rock before the arm 47 contacts with one of the pins 44 on the banking roller 43, said roller being rotated at intervals to bring the proper pin into position for regulating the stroke of said arm, as already described. The movement of plunger 53 toward plunger 54 may be limited in any desired way as by engagement of arm 51 with the end of slide 55 as shown in Fig. 9. This limit would, of course, depend upon the width of the card with which the recorder is intended to be used. Such automatic means for determining the point to which the card may be moved by the grippers is our preferred construction but it will be obvious that the position of the plungers might be regulated by hand or adjusted in various ways, while still preserving some of the features of this invention.

The general operation of the machine may now be briefly traced. The workman inserts his card into the slot of the recorder, the distance to which the card may pass into the slot and accordingly the transverse column of the card which will be brought to the printing line being determined by the position of the banking roll 30, which is automatically varied from day to day by its connection with the clock mechanism. Upon turning the lever C, the plungers or gripping devices are released, the one plunger moves toward the other to grip the card between them, the two plungers with the card are moved transversely of the slot to a point, automatically determined in the construction shown, by the banking roll 43, and the platen is actuated to take the impression. When the card has been used for its allotted time, the data will appear thereon substantially in the manner shown upon the card 70 of Fig. 10 and the figures will read longitudinally of the card thus filled out which is very desirable in order that the data may appear on the card in compact and easily readable form. The provision of mechanism whereby this result can be obtained constitutes an important part of our invention. In order to accomplish this result and at the same time provide a time recorder in which the card is dropped endwise into a slot we arrange the type wheels, as shown, on vertical axes and provide means for moving the card transversely at intervals in order that the successive registrations for special divisions of a period, determined by the position of the banking roller which governs the depth of the insertion of the card, may be made transversely thereof. The advantages of such construction both in providing a card time recorder wherein the card is dropped vertically into the machine, and also one which prints the data on the card so as to read longitudinally thereof will be apparent to those skilled in the art and need not be further elaborated.

The form and arrangement of the record card shown in Fig. 10 is disclosed and claimed in an application of even date with this application and is illustrated herein only to make clear the operation and advantages of the mechanism shown.

It is believed that the features of construction, advantages and operation of this machine will now be apparent.

It is to be understood that we do not consider ourselves limited to the details of construction or mode of operation herein set forth, as various changes would be readily suggested which, while they might materially change the appearance of the machine, would not involve a departure from the scope of the invention herein set forth. Accordingly the mounting of various parts, the means by which various parts are made adjustable, the relative positions of various parts, and the timing of operations may be materially varied under this invention.

It is also understood that the terminology used, both in the description and in the claims, is descriptive and not limiting, being chosen merely as a convenient form of describing the things which constitute the invention here disclosed, the identity of which is apart from their definition in language or their working out into concrete form by a skilled mechanic.

Having described my invention, what I claim as new and desire to secure by Letters Patent is:—

1. In a time recorder, in combination, printing mechanism, means for positioning a card and holding the same while being printed upon comprising oppositely disposed, relatively movable members arranged to receive a card between them, means to cause a relative movement of said members to grip the record card, and means to move the said members to position the card relative to the printing mechanism.

2. In a time recorder, in combination, printing mechanism, means for positioning a card and holding the same while being printed upon comprising oppositely disposed, relatively movable members arranged to receive a card between them, and means to move said members relative to each other to cause them to engage the card at its opposite edges and simultaneously position the card relative to the printing mechanism.

3. In a time recorder, in combination, printing mechanism, means for positioning a card and holding the same while being printed upon comprising oppositely disposed, relatively movable members arranged to receive a card between them, means to move said members relative to each other to cause them to engage the opposite edges of a card and simultaneously position the card relative to the printing mechanism, and means to limit the positioning movement of said members.

4. In a time recorder, in combination, printing mechanism, oppositely disposed, relatively movable members arranged to receive a card between them, means to move said members relative to each other to cause them to engage the opposite edges of a card and simultaneously position the card relative to the printing mechanism, and time-controlled means to limit the positioning movement of said members.

5. In a time-recorder, in combination, printing mechanism, oppositely disposed, relatively movable members arranged to receive a record card between them, manually controlled means to move said members toward each other to grip a card, and simultaneously move said members to position the card relative to the printing mechanism, and time-controlled means limiting the positioning movement of said members.

6. In a time recorder adapted for use with record cards, time printing mechanism, means having a card slot or guide located adjacent said printing mechanism and adapted to hold a card in position to be printed upon, and relatively movable opposed card grippers associated with said means, and adapted to be closed upon the edges of a card inserted within said slot or guide and hold the same during the printing operation.

7. In a time recorder adapted for use with record cards, the printing mechanism, means provided with a slot or guide into which a card is to be inserted, and relatively movable, opposed grippers adapted to be closed upon a card so inserted and moved to shift the card with reference to the printing point.

8. In a time recorder adapted for use with record cards the combination of printing mechanism, means provided with a slot or guide into which the card is to be inserted, and relatively movable opposed grippers adapted to be closed upon a card so inserted and move to shift the card with reference to the printing point.

9. In a time recorder, in combination, printing mechanism, a card receiver located adjacent said printing mechanism and adapted to hold the card in position to be printed upon, a card positioning element movable in the said receiver to determine the position of a card relative to the printing mechanism, and a second element to move the card into engagement with the positioning element and operating therewith, to grip the card, and maintain it in position to be acted upon by the printing mechanism.

10. In a time recorder, in combination, printing mechanism, a card receiver located adjacent said printing mechanism and adapted to hold the card in position to be printed upon, a card positioning element guided in said receiver to determine the position of a card relative to the printing mechanism, means to limit the movement of said element, and a second element to move a card into engagement with the positioning element and operating therewith, to grip the card, and maintain it in position to be acted upon by the printing mechanism.

11. In a time recorder, adapted for use with record cards, in combination, printing mechanism, means in connection therewith for positioning a card and holding the same while being printed upon comprising a set of plungers adapted to engage the edges of the card, and means for moving one of said plungers relatively to the other to hold the card between them.

12. In a time recorder adapted for use with record cards, in combination, a printing mechanism, a set of plungers in connection therewith adapted to engage the edges of the card, and means for moving one of said plungers relatively to the other to hold the card between them and for moving both of said plungers to shift the position of the card with relation to the printing point.

13. In a time recorder adapted for use with record cards, in combination, a printing mechanism, a set of plungers in connection therewith adapted to engage the edges of the card, means for moving one of said plungers relatively to the other to hold the card between them and for moving both of said plungers to shift the position of the card with relation to the printing point, and means for automatically actuating said plungers whereby a card placed in printing relation with reference to said printing mechanism will be moved to a certain predetermined position corresponding to the time at which the impression is taken.

14. In a time recorder adapted for use with record cards, in combination, a printing mechanism, a positioning device adapted to control the position of a card with reference to said printing mechanism, a banking roller adapted to be rotated at a given rate, a series of pins thereon and an arm connected to said positioning device and under spring control tending to throw said positioning device normally to an extreme position, said arm being adapted to contact with and be held successively by said pins.

15. In a time recorder adapted for use with record cards, in combination, a printing mechanism, a plunger adapted to engage one edge of a card placed in printing relation with reference to said printing mechanism, a second plunger for the opposite edge of the card, said plunger being under tension tending to throw it toward the first plunger to grip the card therebetween, means whereby said plunger is held against said movement, and means whereby said plunger is released from said holding means upon the actuation of the machine to perform the printing operation.

16. In a time recorder adapted for use with record cards, in combination, a printing mechanism, a plunger adapted to engage one edge of a card placed in printing relation with reference to said printing mechanism, a second plunger for the opposite edge of the card, said plunger being under tension tending to throw it toward the first plunger to grip the card therebetween, means whereby said plunger is held against said movement, means whereby said plunger may be released from said holding means upon the actuation of the machine and means whereby upon the actuation of the machine both of said plungers may be moved transversely of the printing point.

17. In a time recorder adapted for use with record cards, in combination, a printing mechanism, a plunger adapted to engage one edge of a card placed in printing relation with reference to said printing mechanism, a second plunger for the opposite edge of the card, said plunger being under tension tending to throw it toward the first plunger to grip the card therebetween, means whereby said plunger is held against said movement, means whereby said plunger may be released from said holding means upon the actuation of the machine, means whereby upon the actuation of the machine both of said plungers may be moved transversely of the printing point and means for automatically controlling the extent of said movement.

18. In a time recorder adapted for use with record cards, in combination, a printing mechanism, a plunger in connection therewith, means whereby said plunger may be moved to engage the edge of a record card inserted in operative relation with reference to said printing mechanism, a second coöperative plunger, means whereby said first-mentioned plunger is under tension tending to draw it toward said second plunger and hold it a fixed distance therefrom and means whereby both of said plungers may be moved transversely of the printing point to various predetermined distances corresponding to the time at which the impression is taken.

19. In a device of the class described, in combination, a rotary member, a locking member arranged to move in a plane at substantially right angles to the plane of rotation of said rotary member and adapted to engage the latter to prevent rotation thereof, an actuating element to impart rotation to said rotary member and moving in a path occupied by the locking member when in locking position, said locking member and actuating member having coöperating faces which co-act to swing the locking member from locking position when the rotary member is actuated.

20. In a device of the class described, in combination, a rotary member, a locking member arranged to move in a plane at substantially right angles to the plane of rotation of said rotary member and adapted to engage the latter to prevent rotation thereof, an actuating element to impart rotation to said rotary member and a cam face on the locking member located to be struck by said actuating element to throw the said member away from the rotary member when the latter is rotated.

21. In a time recorder adapted for use in record cards, in combination, a printing mechanism, means for positioning a card and holding the same during the printing operation and comprising a set of movably opposed plungers located adjacent the printing mechanism and adapted to engage the edges of the card, means for moving one of said plungers relative to the other to hold the card between them, and automatic means for controlling the movement of said plunger.

22. In a time recorder adapted for use with record cards, in combination, a printing mechanism, a set of plungers in connection therewith adapted to engage the edges of the card, means for moving one of said plungers relatively to the other to hold the card between them, automatically controlled means for limiting the movement of said plungers, means for actuating said limiting means, and means adapted to lock said limiting means in position.

23. In a time recorder adapted for use with record cards, in combination, a printing mechanism, a set of plungers in connection therewith adapted to engage the edges of the card, means for moving one of said plungers relatively to the other to hold the card between them, automatically controlled means for limiting the movement of said plungers, means for actuating said limiting means, and means adapted to lock said limiting means in position said means becoming inoperative upon the operation of said actuating means.

24. In a time recorder adapted for use with record cards, in combination, printing mechanism, automatically controlled means whereby the depth to which a card may be inserted in operative position with respect to said printing mechanism is varied, means for actuating said limiting means and means for locking the same in each position of rest.

25. In a time recorder adapted for use with record cards, in combination, printing mechanism, means adapted to position the card laterally with respect to said printing mechanism, automatically-controlled means limiting such movement, means whereby the position of said card longitudinally with respect to said printing mechanism is automatically controlled, means for actuating said last-mentioned means and means for locking the same in each of its positions of rest.

26. In a card time recorder, printing mechanism, means for positioning a card and holding the same during the printing operation and comprising a card receiver including a surface movable to determine the position of a card relative to said printing mechanism, and means to move the card against said surface.

27. In a card time recorder, printing mechanism, means for positioning a card and holding the same during the printing operation and comprising a card receiver including a surface movable to determine the position of a card relative to said printing mechanism, means to move the card against said surface, and means to actuate said moving means.

28. In a card time recorder, printing mechanism, a card receiver including a surface movable to determine the position of a card relative to said printing mechanism, means to move the card against said surface, and manually released means to automatically actuate said moving means.

29. In a card time recorder, printing mechanism, a card receiver including means movable to determine the position of a card relative to said printing mechanism, time controlled means to limit the movement of said movable means, means to move a card against said movable means, and manually controlled means to actuate said last named moving means.

30. In a time recorder, in combination, printing mechanism, oppositely disposed, relatively movable members adapted to receive a card between them, means to hold said members spaced from each other, means to cause relative movement of said members to grip a card when released from the holding means, and means to shift said members to position the card relative to the printing point.

31. In a time recorder, in combination, a card-holder comprising a portion against which the edge of an inserted card rests and means projecting over the front and rear surfaces of the card adjacent its opposite edges and adapted to support the same in vertical position, a relatively movable member opposite said first portion adapted to engage the opposite edge of the card and justify the same against said first portion, time-controlled printing mechanism, and manually-controlled means adapted to force the card against said printing mechanism and to cause the movement of said relatively movable member to justify the card.

32. In a time recorder, in combination, a card-holder comprising a portion against which one edge of the inserted card rests and means projecting over the front and rear surfaces of the card adapted to support the same in vertical position, a relatively movable member adapted to engage the opposite edge of the card and justify the same against said first portion, printing mechanism, a spring, and manually-controlled means adapted to bring the card into operative relation to said printing mechanism and to act through said spring to justify the same.

33. In a time recorder, in combination, a card-holder comprising a portion against which an edge of an inserted card rests and means projecting over the front and rear surfaces of an inserted card and diverging to form a flared mouth thereto, a relatively movable member adapted to engage the opposite edge of an inserted card to justify the same against said first portion, printing mechanism, a spring, and manually-controlled means adapted to act through said spring to justify said card and adapted to bring the same into operative relation to said printing mechanism.

34. In a time recorder, in combination, a card-holder comprising a portion against which the edge of an inserted card rests and means projecting over the front and rear surfaces of the card adjacent its opposite edges and adapted to support the same in vertical position, a relatively movable member opposite said first portion adapted to engage the opposite edge of the card and justify the same against the first portion, time-controlled printing mechanism, and manually-controlled means adapted to force the card against said printing mechanism and to cause the movement of said relatively movable member to justify the card, said first portion being movable relatively to said printing mechanism to bring different portions of the card opposite the printing point.

35. In a time recorder, in combination, a card-holder comprising a portion against which one edge of the inserted card rests and means projecting over the front and rear surfaces of the card adapted to support the same in vertical position, a relatively movable member adapted to engage the opposite edge of the card and justify the same against said first portion, printing mechanism, a spring, and manually-controlled means adapted to bring the card into operative relation to said printing mechanism and to act through said spring to justify the same, said first portion being movable relatively to said printing mechanism to bring different portions of the card opposite the printing point.

36. The combination with time recording means, of a card receiver or guide, means to vary at predetermined intervals the position in one direction of a card in said receiver, and means to automatically act upon the card in a transverse direction to aline the same in the receiver in each of such successive positions.

37. The combination with a time stamp and operating means therefor, of means to support a card vertically in each of a series of successive positions relatively to the time stamp at predetermined intervals of time, and separate means to engage the upright edge of a card and aline the same at each actuation of the time stamp.

38. In a time recorder, a time stamp, and operating devices therefor, combined with a card receiver, a series of stops to act individually upon and thereby limit the movement of a card, relative to the time stamp, when inserted in the receiver, mechanism controlled by a time movement to operate said stops, and automatic means to laterally position the card in the receiver.

39. In a time recorder, in combination, printing mechanism, a card receiver comprising opposed members between which a card is received, means to move said members simultaneously to take a determined position relative to the printing mechanism, means to hold one of said members in such position, and means to move the other member toward the member so held.

In testimony whereof we affix our signatures, in the presence of two witnesses.

JOHN DEY.
ALEXANDER DEY.

Witnesses:
B. E. SNYDER,
MILLIR HILDE.